United States Patent Office 3,108,051
Patented Oct. 22, 1963

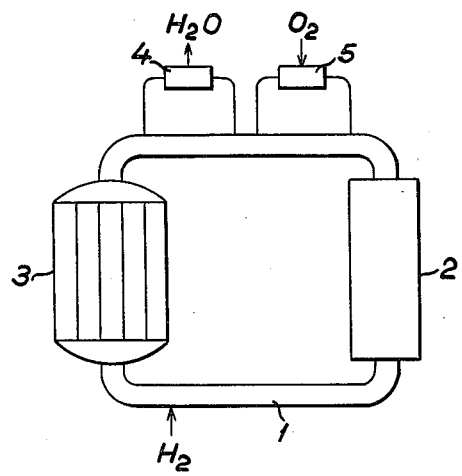

3,108,051
METHOD FOR INHIBITING REACTION BETWEEN CARBON DIOXIDE AND GRAPHITE IN A HETEROGENEOUS NUCLEAR REACTOR
Olle Lindstrom, Vasteras, Sweden, assignor to Allmanna Svenska Elektriska Aktiebolaget, Vasteras, Sweden, a Swedish corporation
Filed Nov. 14, 1960, Ser. No. 69,151
Claims priority, application Sweden Nov. 19, 1959
3 Claims. (Cl. 204—154.2)

In heterogeneous nuclear reactors carbon dioxide gas is preferably used as coolant and graphite as moderator. Under the influence of the radiation from the reactor the reaction $CO_2+C=2CO$ occurs with considerable speed already under 500° C., a temperature at which the pure thermal reaction is negligible. This reaction consumes graphite so that the reactor core after a certain time of operation has to be exchanged. This problem is supposed to be more troublesome on reactors which work with high pressure and neutron flow, such as reactors in rock spaces. The mechanism of reaction is not entirely known. The speed of the reaction is likely to be influenced by the activation by radiation of the carbon dioxide and/or of the graphite.

The purpose of the present invention is to inhibit said reactions and the invention is characterised in that hydrogen gas is supplied continuously to the carbon dioxide before it passes through the reactor. Hydrogen gas reacts with intermediary reaction partners both at gas activation and graphite activation.

A study of these reactions shows that the hydrogen gas is consumed during formation of water vapour. Great amounts of water vapour should be avoided in the cooling circuits and it is therefore a further characteristic of the invention that the water vapour is continuously removed in a condensing apparatus or a drying filter.

A device for carrying out the method according to the invention is shown in principle in the drawing.

Hydrogen gas is fed continuously into the return conduit 1 between the heat exchanger 2 and the reactor 3, so that the concentration of said gas in the carbon dioxide at steady state lies between 0.05% and 10%, preferably at 1%. Water vapour formed is removed in an auxiliary circuit 4 through which a small flow of the coolant is led so that the equilibrium concentration of the water vapour lies at about 0.5 to 0.1%. The concentration limits for the water vapour depend on what can be tolerated with respect to the reactor construction in question. The thermal water-gas reaction is slow at the temperatures in question. However, the carbon monoxide concentration will still increase in the system as the hydrogen reacts with activated carbon dioxide which would otherwise have consumed graphite. A special circuit 5 can therefore be arranged for regulating the carbon monoxide content of the cooling gas by catalytic combustion with oxygen gas.

I claim:
1. In a heterogeneous nuclear reactor cooled by carbon dioxide and moderated by graphite wherein carbon dioxide is in contact with the graphite during the passage of the coolant through the reactor core to a heat exchanger means, the method of inhibiting reaction between carbon dioxide and graphite which comprises adding hydrogen gas continuously to the carbon dioxide before passing it over the graphite, and removing water vapour formed in the reactor continuously in an auxiliary circuit between the reactor and a heat exchanger means, the auxiliary circuit comprising a water vapour capturing means.

2. In a heterogeneous nuclear reactor cooled by carbon dioxide and moderated by graphite wherein carbon dioxide is in contact with the graphite during the passage of the coolant through the reactor core to a heat exchanger means, the method of inhibiting reaction between carbon dioxide and graphite which comprises adding hydrogen gas continuously to the carbon dioxide before passing it over the graphite, and regulating the concentration of carbon monoxide appearing in the coolant an auxiliary circuit through catalytic combustion with oxygen.

3. In a heterogeneous nuclear reactor cooled by carbon dioxide and moderated by graphite wherein carbon dioxide is in contact with the graphite during the passage of the coolant through the reactor core to a heat exchanger means, the method of inhibiting reaction between carbon dioxide and graphite which comprises adding hydrogen gas continuously to the carbon dioxide before passing it over the graphite, removing water vapour formed in the reactor continuously in a first auxiliary circuit between the reactor and the heat exchanger, the first auxiliary circuit comprising a water vapour capturing means, and regulating the concentration of carbon monoxide appearing in the coolant in a second auxiliary circuit through catalytic combustion with oxygen.

References Cited in the file of this patent

AERE–C/R–1374, The Effect of Pile Radiation on the Carbon-Dioxide-Graphite Reaction, 1955, pages 1–23.

H/W 56, 362, Gas Cooled Power Reactor Coolant Choice, June 1958, pages 4–9.

TID–7564, Information Meeting on Gas-Cooled Power Reactors, December 1958, pages 185–192.

Anderson, et al.: Proceedings of the Second United Nations Conference on the Peaceful Uses of Atomic Energy, September 1958, vol. 7, pages 335–373.